(12) United States Patent
Romer et al.

(10) Patent No.: US 11,762,117 B2
(45) Date of Patent: Sep. 19, 2023

(54) DOWNHOLE TOOLS AND METHODS FOR DETECTING A DOWNHOLE OBSTRUCTION WITHIN A WELLBORE

(71) Applicant: ExxonMobil Technology and Engineering Company, Spring, TX (US)

(72) Inventors: Michael C. Romer, The Woodlands, TX (US); Timothy G. Benish, Spring, TX (US); Rami Jabari, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 317 days.

(21) Appl. No.: 16/653,206

(22) Filed: Oct. 15, 2019

(65) Prior Publication Data

US 2020/0158903 A1    May 21, 2020

Related U.S. Application Data

(60) Provisional application No. 62/769,314, filed on Nov. 19, 2018.

(51) Int. Cl.
*G01V 1/00* (2006.01)
*G01V 1/44* (2006.01)
(Continued)

(52) U.S. Cl.
CPC ............ *G01V 1/44* (2013.01); *G01V 1/104* (2013.01); *G01V 1/135* (2013.01)

(58) Field of Classification Search
USPC .......................................................... 367/86
See application file for complete search history.

(56) References Cited

U.S. PATENT DOCUMENTS 6,328,102 B1    12/2001   Dean
6,631,762 B2 *  10/2003   Collette ............... E21B 43/128
                                                   166/250.15
(Continued)

FOREIGN PATENT DOCUMENTS

EP    2 077 374 A1    7/2009
GB    2 393 747 A     4/2004
(Continued)

*Primary Examiner* — James R Hulka
(74) *Attorney, Agent, or Firm* — ExxonMobil Technology and Engineering Company—Law Department

(57) ABSTRACT

Downhole tools and methods for detecting a downhole obstruction within a wellbore. The downhole tools include a positioning mechanism, which is configured to facilitate positioning of the downhole tool within a target region of a wellbore of a hydrocarbon well, an acoustic pulse generator, which is configured to generate an acoustic pulse within a wellbore liquid that extends within the wellbore and fluidly contacts the downhole tool, and a sensor assembly, which is configured to detect a reflected acoustic pulse within the wellbore liquid. The methods include positioning a downhole tool within a target region of a wellbore, generating an acoustic pulse, propagating the acoustic pulse within a wellbore liquid, and reflecting the acoustic pulse from a downhole obstruction. The methods also include propagating a reflected acoustic pulse within the wellbore liquid, receiving the reflected acoustic pulse, and characterizing the downhole obstruction based upon the reflected acoustic pulse.

22 Claims, 3 Drawing Sheets

(51) Int. Cl.
*G01V 1/135* (2006.01)
*G01V 1/104* (2006.01)

(56) References Cited

U.S. PATENT DOCUMENTS

| | | | |
|---|---|---|---|
| 6,926,504 B2 * | 8/2005 | Howard | E21B 27/02 417/417 |
| 7,111,675 B2 | 9/2006 | Zisk, Jr. | |
| 7,322,803 B2 | 1/2008 | Vogeley | |
| 7,484,940 B2 | 2/2009 | O'Niell | |
| 7,597,150 B2 | 10/2009 | Clem | |
| 7,610,964 B2 * | 11/2009 | Cox | E21B 43/121 166/105 |
| 7,789,142 B2 * | 9/2010 | Dotson | E21B 41/0085 166/250.15 |
| 7,984,760 B2 | 7/2011 | Haeberle et al. | |
| 8,133,041 B2 | 3/2012 | Ludlow et al. | |
| 8,220,533 B2 | 7/2012 | Longfield et al. | |
| 8,301,425 B2 | 10/2012 | Dale et al. | |
| 8,473,268 B2 | 6/2013 | Benish et al. | |
| 8,511,390 B2 | 8/2013 | Coyle et al. | |
| 8,899,339 B2 | 12/2014 | Tolman et al. | |
| 9,863,222 B2 | 1/2018 | Morrow et al. | |
| 9,945,208 B2 | 4/2018 | Tolman et al. | |
| 9,963,960 B2 | 5/2018 | Tolman et al. | |
| 9,970,261 B2 | 5/2018 | Tolman et al. | |
| 9,976,399 B2 | 5/2018 | Tolman et al. | |
| 10,012,059 B2 | 7/2018 | Romer et al. | |
| 10,018,021 B2 | 7/2018 | Romer et al. | |
| 10,024,131 B2 | 7/2018 | Tolman et al. | |
| 10,030,473 B2 | 7/2018 | Tolman et al. | |
| 10,030,489 B2 | 7/2018 | Romer et al. | |
| 10,030,508 B2 | 7/2018 | Romer et al. | |
| 10,087,719 B2 | 10/2018 | Tolman et al. | |
| 10,132,143 B2 | 11/2018 | Romer et al. | |
| 10,138,707 B2 | 11/2018 | Tolman et al. | |
| 10,221,639 B2 | 3/2019 | Romer et al. | |
| 10,221,663 B2 | 3/2019 | Romer et al. | |
| 10,352,130 B2 | 7/2019 | Tolman et al. | |
| 10,358,896 B2 | 7/2019 | Romer et al. | |
| 10,443,370 B2 | 10/2019 | Wang et al. | |
| 10,450,848 B2 | 10/2019 | Wang et al. | |
| 10,465,505 B2 * | 11/2019 | Disko | E21B 47/14 |
| 10,480,297 B2 | 11/2019 | Chidi et al. | |
| 10,480,501 B2 | 11/2019 | Tolman et al. | |
| 10,612,352 B2 | 4/2020 | Tolman et al. | |
| 10,648,303 B2 | 5/2020 | Romer et al. | |
| 10,662,745 B2 | 5/2020 | Tolman et al. | |
| 10,697,287 B2 | 6/2020 | Romer et al. | |
| 10,724,350 B2 | 7/2020 | Tolman et al. | |
| 10,753,185 B2 | 8/2020 | Flowers et al. | |
| 10,760,387 B2 | 9/2020 | Frantz, III et al. | |
| 10,830,003 B2 | 11/2020 | Romer et al. | |
| 11,035,201 B2 | 6/2021 | Frazier et al. | |
| 11,286,748 B2 | 3/2022 | Romer et al. | |
| 2002/0197174 A1 | 12/2002 | Howard | |
| 2003/0010491 A1 | 1/2003 | Collette | |
| 2003/0034899 A1 * | 2/2003 | Zisk, Jr. | E21B 23/04 340/853.1 |
| 2004/0104068 A1 * | 6/2004 | Egerev | G01V 1/523 181/102 |
| 2005/0244288 A1 * | 11/2005 | O'Neill | A61M 5/14224 417/413.2 |
| 2006/0147325 A1 * | 7/2006 | Vogeley | F15B 15/18 417/413.2 |
| 2006/0198742 A1 | 9/2006 | DiFoggio et al. | |
| 2008/0080991 A1 | 4/2008 | Yuratich et al. | |
| 2009/0014181 A1 * | 1/2009 | Vinegar | E21B 43/243 166/302 |
| 2009/0073806 A1 * | 3/2009 | Mandal | G01V 1/44 367/35 |
| 2009/0120646 A1 * | 5/2009 | Kim | C10G 1/02 166/302 |
| 2009/0183879 A1 | 7/2009 | Cox | |
| 2009/0194289 A1 * | 8/2009 | Clem | E21B 43/32 166/320 |
| 2009/0194333 A1 * | 8/2009 | MacDonald | E21B 43/24 175/45 |
| 2009/0218091 A1 | 9/2009 | Dotson | |
| 2009/0260824 A1 * | 10/2009 | Burns | E21B 36/04 166/57 |
| 2009/0288881 A1 * | 11/2009 | Mullins | E21B 47/022 175/50 |
| 2010/0012313 A1 | 1/2010 | Longfield | |
| 2010/0061183 A1 * | 3/2010 | Mandal | G01N 29/348 367/29 |
| 2010/0074776 A1 * | 3/2010 | Ludlow | F04B 17/003 417/415 |
| 2010/0107754 A1 * | 5/2010 | Hartog | G01V 1/226 73/152.47 |
| 2010/0191516 A1 | 7/2010 | Benish et al. | |
| 2010/0195436 A1 * | 8/2010 | Kamata | E21B 49/087 181/102 |
| 2011/0087471 A1 | 4/2011 | Postl et al. | |
| 2011/0088895 A1 * | 4/2011 | Pop | E21B 7/04 166/254.2 |
| 2011/0186302 A1 * | 8/2011 | Coyle | E21B 43/121 166/372 |
| 2012/0170406 A1 * | 7/2012 | DiFoggio | E21B 47/103 367/35 |
| 2012/0023606 A1 | 10/2012 | Bouldin et al. | |
| 2014/0071790 A1 * | 3/2014 | Mandal | G01N 29/4427 367/27 |
| 2014/0169127 A1 * | 6/2014 | Orban | G01V 1/48 367/25 |
| 2014/0332212 A1 * | 11/2014 | Ayers | C09K 8/58 507/131 |
| 2015/0000982 A1 * | 1/2015 | Mcdowell | E21B 34/10 175/57 |
| 2015/0012253 A1 * | 1/2015 | O'Donnell | E21B 17/00 703/2 |
| 2015/0060055 A1 | 3/2015 | Tolman et al. | |
| 2015/0060064 A1 * | 3/2015 | Lafferty | E21B 34/14 166/185 |
| 2015/0114632 A1 | 4/2015 | Romer et al. | |
| 2015/0240602 A1 | 8/2015 | Troshko et al. | |
| 2015/0247942 A1 * | 9/2015 | Pomerantz | E21B 49/00 702/11 |
| 2015/0275649 A1 * | 10/2015 | Orban | G01N 23/00 235/375 |
| 2016/0041132 A1 | 2/2016 | Romer et al. | |
| 2016/0145995 A1 * | 5/2016 | Hannegan | E21B 47/005 166/250.14 |
| 2017/0044876 A1 | 2/2017 | Romer et al. | |
| 2017/0051593 A1 | 2/2017 | Romer et al. | |
| 2017/0089157 A1 * | 3/2017 | Noske | E21B 34/102 |
| 2017/0110220 A1 | 4/2017 | Romer et al. | |
| 2017/0183945 A1 | 6/2017 | Tolman et al. | |
| 2017/0183946 A1 | 6/2017 | Tolman et al. | |
| 2017/0292364 A1 * | 10/2017 | Li | E21B 44/005 |
| 2017/0306752 A1 * | 10/2017 | Mandal | E21B 47/107 |
| 2017/0335685 A1 * | 11/2017 | Breaux | G01V 1/52 |
| 2018/0031732 A1 * | 2/2018 | Mosse | G01V 99/005 |
| 2018/0058191 A1 * | 3/2018 | Romer | E21B 43/122 |
| 2018/0058202 A1 * | 3/2018 | Disko | E21B 47/017 |
| 2018/0058211 A1 * | 3/2018 | Liang | G01V 1/282 |
| 2018/0238155 A1 * | 8/2018 | Nguyen | C09K 8/80 |
| 2018/0252084 A1 * | 9/2018 | Nguyen | E21B 47/06 |
| 2018/0347337 A1 | 12/2018 | Romer et al. | |
| 2019/0196041 A1 * | 6/2019 | Yao | E21B 47/01 |
| 2019/0390538 A1 | 12/2019 | Frantz, III et al. | |
| 2020/0141201 A1 | 5/2020 | Kibey et al. | |
| 2020/0190965 A1 | 6/2020 | Romer et al. | |
| 2020/0362698 A1 * | 11/2020 | Romer | E21B 47/07 |

FOREIGN PATENT DOCUMENTS

| | | |
|---|---|---|
| GB | 2 403 752 A | 1/2005 |
| WO | WO 01/20126 A2 | 3/2001 |

(56) References Cited

FOREIGN PATENT DOCUMENTS

| WO | WO 2009/077714 | 6/2009 | | |
|----|----------------|--------|---|---|
| WO | WO-2010042723 A2 * | 4/2010 | ............ | E21B 10/00 |
| WO | WO 2011/079218 A2 | 6/2011 | | |

* cited by examiner

DOWNHOLE TOOLS AND METHODS FOR DETECTING A DOWNHOLE OBSTRUCTION WITHIN A WELLBORE

CROSS-REFERENCE TO RELATED APPLICATION

This application claims the benefit of U.S. Provisional Application 62/769,314 filed Nov. 19, 2018 entitled "Downhole Tools and Methods for Detecting a Downhole Obstruction within a Wellbore," the entirety of which is incorporated by reference herein.

FIELD OF THE DISCLOSURE

The present disclosure relates generally to downhole tools and/or to methods for detecting a downhole obstruction within a wellbore and more particularly to downhole tools and/or methods that utilize an acoustic pulse to detect the downhole obstruction.

BACKGROUND OF THE DISCLOSURE

Hydrocarbon wells generally include a wellbore that extends within a subsurface region. During formation and/or completion of the hydrocarbon well, one or more plugs may be positioned within the wellbore. Prior to operation of the hydrocarbon well, these plugs may be removed, or drilled out, thereby generating debris within the wellbore. This debris may collect and/or remain within the wellbore. Additionally or alternatively, during operation of the hydrocarbon well, solids such as sand, scale, paraffin, wax, and/or asphaltenes may collect and/or agglomerate within the wellbore. The debris and/or solids may form obstructions within the wellbore, which may restrict production of reservoir fluids via the hydrocarbon well.

Removal of these obstructions may be costly and time-consuming, often requiring that production from the hydrocarbon well be ceased. As an example, chemical clean out operations may be performed in which a chemical is injected into the wellbore and dissolves the obstructions. As another example, a physical cleanout operation may be performed in which jointed pipe, coiled tubing, and/or other tools are used to physically dislodge and/or remove the obstructions from the wellbore.

While the above techniques may be effective at removing obstructions, they disrupt production from the well and add expense to the production operation. Accordingly, it may be desirable to decrease and/or to minimize the frequency with which such techniques are performed. Additionally or alternatively, it may be desirable to characterize the obstruction so that the most appropriate, or effective, technique may be utilized. More specifically, knowledge of the presence, location, extent, and/or chemical composition of the obstruction may permit more targeted and/or effective removal techniques to be selected and/or performed.

Historically, obstructions have been detected empirically via changes in a production rate from the hydrocarbon well. While such detection methodologies may at least indirectly indicate the presence of at least one obstruction in at least one location within the wellbore, changes in production rate generally cannot be utilized to quantify the location, extent, and/or chemical composition of the obstruction(s). Thus, there exists a need for improved downhole tools and/or methods for detecting a downhole obstruction within a wellbore.

SUMMARY OF THE DISCLOSURE

Downhole tools and methods for detecting a downhole obstruction within a wellbore are disclosed herein. The downhole tools include a positioning mechanism, an acoustic pulse generator, and a sensor assembly. The positioning mechanism is configured to facilitate positioning of the downhole tool within a target region of a wellbore of a hydrocarbon well. The acoustic pulse generator is configured to generate an acoustic pulse within a wellbore liquid that extends within the wellbore and fluidly contacts the downhole tool. The sensor assembly is configured to detect a reflected acoustic pulse within the wellbore liquid.

The methods include positioning a downhole tool within a target region of a wellbore. A wellbore liquid extends within the wellbore, and the positioning includes positioning such that the wellbore liquid fluidly contacts the downhole tool. The methods also include generating an acoustic pulse with an acoustic pulse generator of the downhole tool and propagating the acoustic pulse within the wellbore liquid and in a downhole direction. The methods further include reflecting the acoustic pulse from a downhole obstruction to generate a reflected acoustic pulse and propagating the reflected acoustic pulse within the wellbore liquid and in an uphole direction. The methods also include receiving the reflected acoustic pulse with an acoustic detector of a sensor assembly of the downhole tools and characterizing the downhole obstruction based, at least in part, on the reflected acoustic pulse.

DETAILED DESCRIPTION AND BEST MODE OF THE DISCLOSURE

Figure 1:
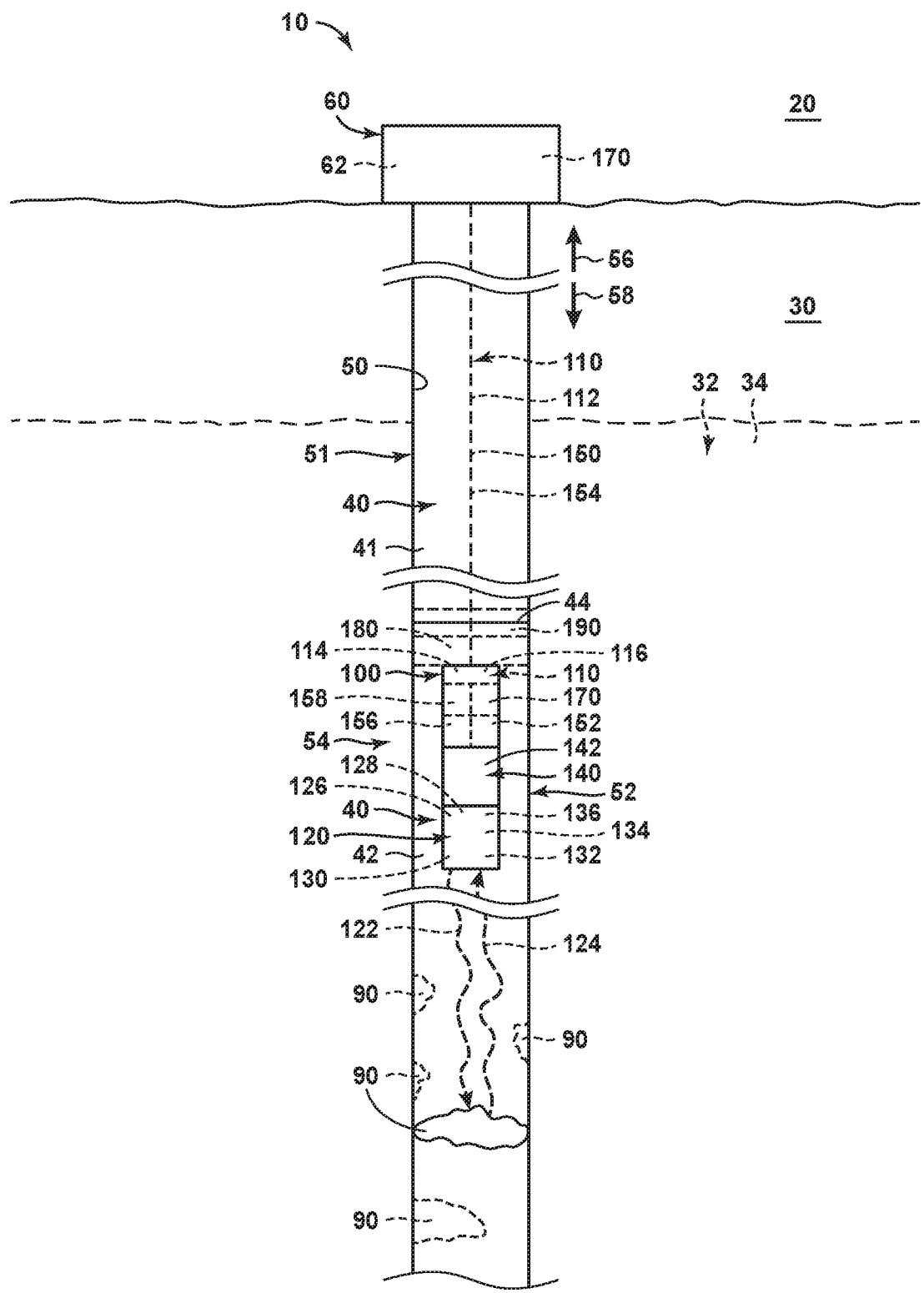
FIG. 1 is a schematic illustration of examples of a downhole tool positioned within a hydrocarbon well, according to the present disclosure.
Figure 2:
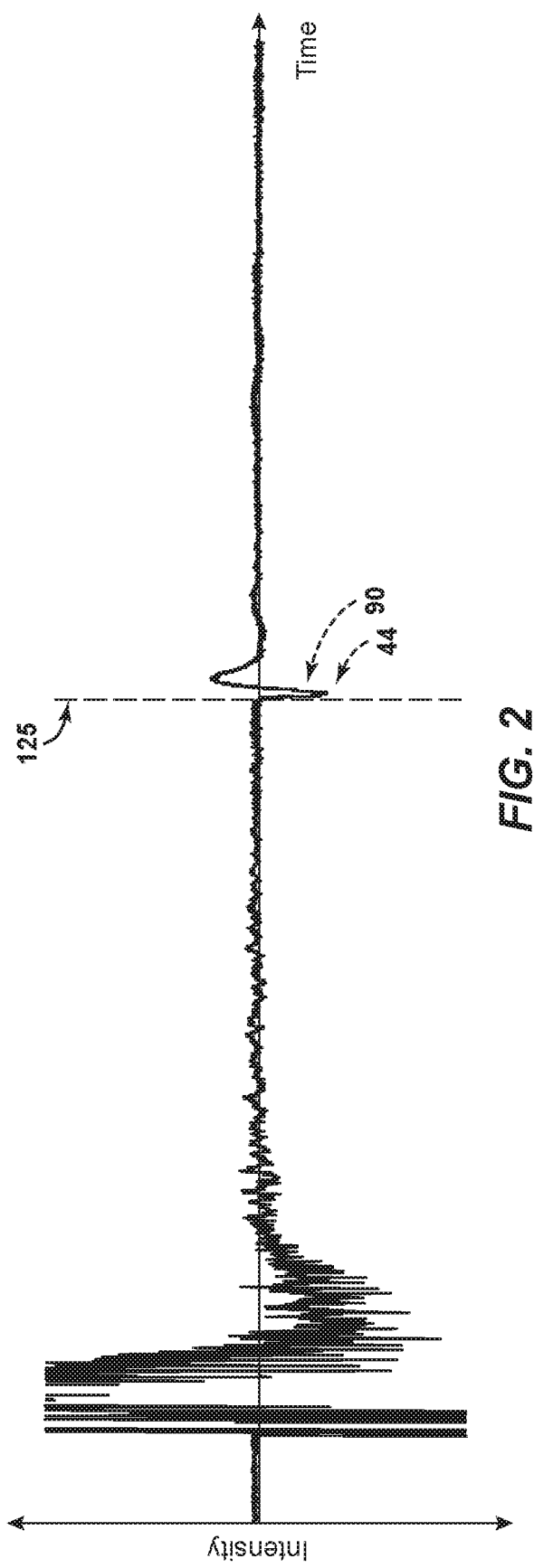
FIG. 2 is an example of an acoustic trace that may be received and/or analyzed utilizing the downhole tools and/or methods, according to the present disclosure.
Figure 3:
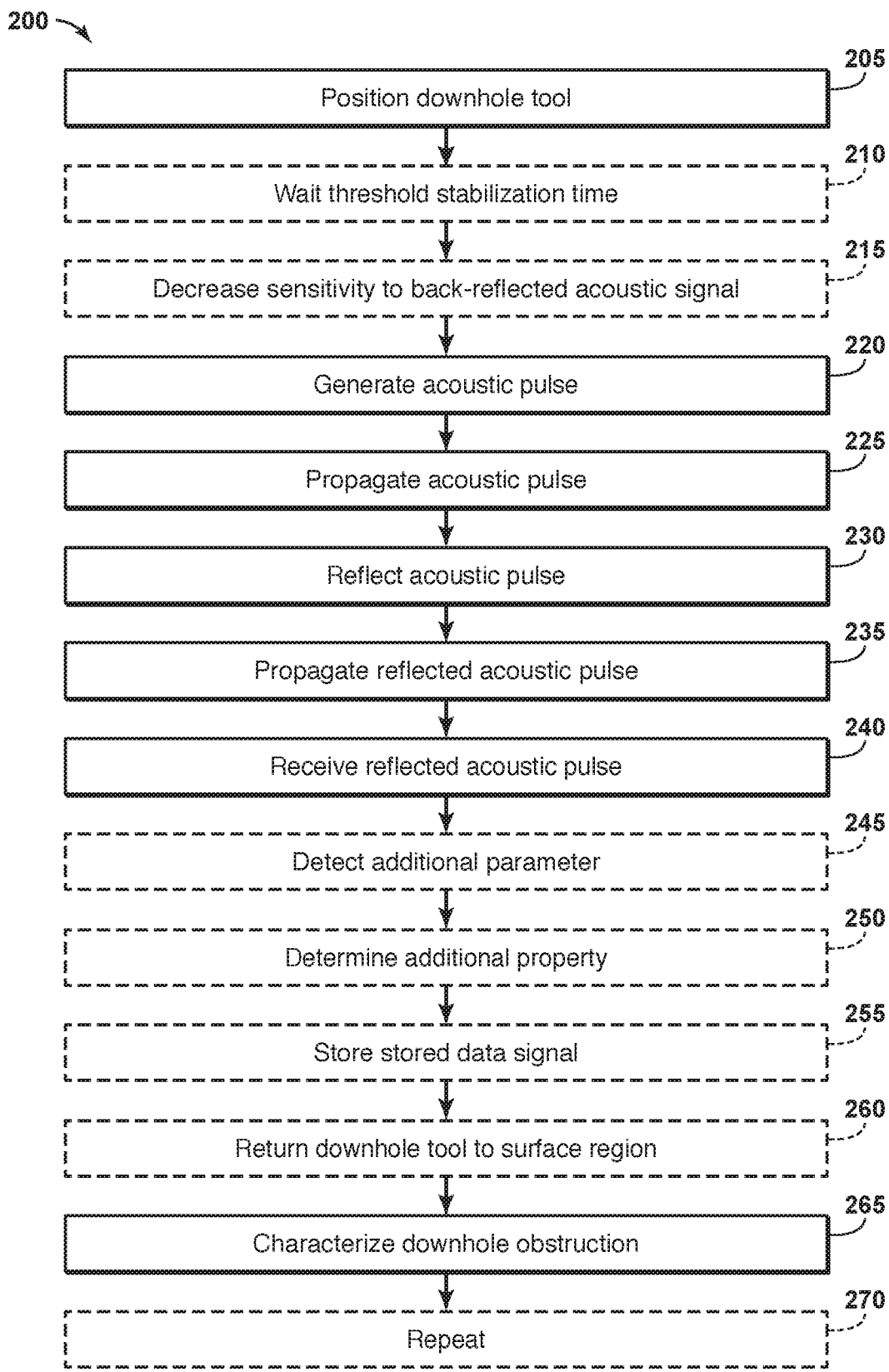
FIG. 3 is a flowchart depicting examples of methods, according to the present disclosure, of detecting a downhole obstruction within a wellbore.

FIGS. 1-3 provide examples of hydrocarbon wells 10, of downhole tools 100, and/or of methods 200, according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic illustration of examples of a downhole tool 100 positioned within a hydrocarbon well 10, according to the present disclosure. Hydrocarbon well 10 includes a wellbore 50 that extends within a subsurface region 30. The wellbore also may be referred to herein as extending between a surface region 20 and subsurface region 30 and/or as extending within a subterranean formation 32 that may include a formation fluid 34.

A plurality of fluids 40 extends within wellbore 50. The plurality of fluids includes a first fluid 41 and a second fluid 42 that define a fluid interface 44 therebetween. The first fluid extends within a first region 51 of the wellbore, while the second fluid extends within a second region 52 of the wellbore. Second region 52 is downhole, or in a downhole direction 58, from first region 51. Additionally or alternatively, first region 51 is uphole, or in an uphole direction 56, from second region 52. First fluid 41 and second fluid 42 are phase-separated from one another such that the first fluid and the second fluid extend within distinct regions of wellbore 50 and define fluid interface 44.

It is within the scope of the present disclosure that the first fluid and/or the second fluid may include and/or be any suitable fluid. As an example, the first fluid may include a gas and the second fluid may include a liquid. Under these conditions, the fluid interface may be referred to herein as a gas-liquid interface. Examples of the gas include air, carbon dioxide, nitrogen, and/or natural gas. Examples of the liquid include water and/or a hydrocarbon liquid.

As another example, the first fluid may include a first liquid and the second fluid may include a second liquid. Under these conditions, the first liquid may have a first liquid density that is less than a second liquid density of the second liquid, and the fluid interface may be referred to herein as a liquid-liquid interface. In addition, the first liquid and the second liquid may be immiscible. An example of the first liquid includes the hydrocarbon liquid. An example of the second liquid includes water.

As yet another example, the first fluid and/or the second fluid may include and/or be a mixture, an emulsion, or a fluid mixture of two or more fluids that may or may not be phase-separated within the first fluid and/or within the second fluid. In this context, an example of the first fluid includes a mixture of a hydrocarbon liquid and a gas, examples of which are disclosed herein, and an example of the second fluid may include a mixture of the hydrocarbon liquid and water.

FIG. 1 illustrates a single fluid interface 44. However, it is within the scope of the present disclosure that hydrocarbon well 10 and/or wellbore 50 thereof may include a plurality of fluid interfaces 44 and/or that downhole tools 100 may be positioned at and/or downhole from any suitable fluid interface in the plurality of fluid interfaces. As an example, hydrocarbon well 10 may include a first fluid interface in the form of a gas-liquid interface and a second fluid interface in the form of a liquid-liquid interface. As another example, hydrocarbon well 10 may include a horizontal region that may include a plurality of gas-liquid interfaces and/or a plurality of liquid-liquid interfaces within localized low and/or high segments of the horizontal region.

Hydrocarbon well 10 also includes downhole tool 100, which also may be referred to herein as a downhole acoustic tool 100, as an acoustic tool 100, and/or simply as a tool 100. Downhole tool 100 includes an acoustic pulse generator 120 and a sensor assembly 140, both of which are positioned within second region 52 of wellbore 50. Stated another way, both acoustic pulse generator 120 and sensor assembly 140 are in fluid contact with second fluid 42 and/or are downhole from fluid interface 44. Stated yet another way, tool 100 may be positioned within a target region 54 of wellbore 50, and target region 54 may be at least partially downhole from fluid interface 44.

Hydrocarbon well 10 further may include one or more downhole obstructions 90. As illustrated in FIG. 1, downhole obstructions 90 may be downhole from downhole tool 100. Obstructions 90 may partially and/or completely block wellbore 50 and/or may partially and/or completely block fluid flow through the wellbore.

During operation of hydrocarbon well 10 and/or of tool 100, the downhole tool, or at least acoustic pulse generator 120 thereof, may generate an acoustic pulse 122. The acoustic pulse may be directed at least partially in downhole direction 58, and acoustic pulse 122 may interact with, or reflect from, the one or more obstructions 90 that are downhole from tool 100, thereby generating reflected acoustic pulse 124. The reflected acoustic pulse may travel in uphole direction 56 and may reach and/or may be sensed by sensor assembly 140.

An example of such a reflected acoustic pulse 124, as sensed by sensor assembly 140, is illustrated in FIG. 2. FIG. 2 plots an intensity of sound detected by sensor assembly 40 as a function of time. As illustrated in FIG. 2, and immediately subsequent to initiation of acoustic pulse 122, sensor assembly 140 may detect noise and/or ringing, which may decrease with time as the acoustic pulse travels away from acoustic pulse generator 120 and/or away from the sensor assembly. However, as discussed, acoustic pulse 122 reflects from obstructions 90 and returns to sensor assembly 140 as reflected acoustic pulse 124. As such, and after a period of time that is sufficient for the acoustic pulse to travel to the obstruction and for the reflected acoustic pulse to return to the sensor assembly, a change and/or an increase in the acoustic intensity is detected by the sensor assembly, as indicated at 125. As discussed in more detail herein, the elapsed time between initiation of acoustic pulse 122 and receipt of reflected acoustic pulse 124 by sensor assembly 140 may be utilized to calculate and/or to quantify the location of obstruction 90 and/or a distance between downhole tool 100 and the obstruction.

FIG. 2 illustrates a simplified situation in which acoustic pulse 122 reflects from single downhole obstruction 90. However, it is within the scope of the present disclosure that the hydrocarbon well may include a plurality of downhole obstructions, as illustrated schematically in FIG. 1 and indicated at 90. When present, the plurality of downhole obstructions may generate a plurality of distinct reflected acoustic pulses 124, each of which may be received and/or detected by sensor assembly 140. Under these conditions, the illustration of FIG. 2 may include a plurality of intensity changes 125, with each intensity change 125 being associated with a distinct downhole obstruction 90. Stated another way, each downhole obstruction 90 that generates a corresponding distinct reflected acoustic pulse 124 may be detected and/or measured by downhole tool 100. With the above in mind, downhole tools 100 and/or methods 200, according to the present disclosure, may be utilized to detect and/or to quantify a location of a debris field, within wellbore 50, that is downhole from tool 100 and/or that is defined by downhole obstructions 90.

In addition, a magnitude of the intensity change observed for a given reflected acoustic pulse may be utilized to estimate and/or quantify a magnitude, an extent, and/or a size of a corresponding downhole obstruction 90. Furthermore, if wellbore 50 is fully blocked by a single downhole obstruction 90, such as is illustrated in solid lines in FIG. 1, acoustic pulse 122 may not travel past that downhole obstruction. As such, there may be no intensity changes 125, or at least no intensity changes 125 generated by a single reflection of acoustic pulse 122, at times greater than the time needed for the acoustic pulse to travel to the blocking downhole obstruction.

It is within the scope of the present disclosure that downhole obstructions 90 that only partially block wellbore 50 also may be referred to herein as, or as causing, a restriction in wellbore 50. Such restrictions may define a region of decreased cross-sectional area for propagation of acoustic pulse 122 therepast, and this decrease in cross-sectional area may cause a change, or an increase, in the speed of sound within the wellbore, or of the speed of the acoustic wave as it travels through and/or past the restriction. As discussed in more detail herein, this change in speed of the acoustic wave may be utilized to indicate the presence of the restriction and/or may be a consideration during analysis of the reflected acoustic pulse.

As discussed herein, at least acoustic pulse generator 120 and sensor assembly 140 of tool 100 are within second region 52 of wellbore 50 and/or are downhole from fluid interface 44. This configuration permits tool 100 to detect obstructions 90 that are downhole from the fluid interface. Stated another way, if acoustic pulse generator 120 and/or sensor assembly 140 of tool 100 were uphole from fluid interface 44, acoustic pulse 122 would be reflected, entirely reflected, or at least substantially entirely reflected, at the fluid interface, as also indicated in FIG. 2 at 44. Such a configuration would preclude detection of downhole obstructions 90 that are downhole from the fluid interface. As such, configuration and/or positioning of at least acoustic pulse generator 120 and sensor assembly 140 of tool 100 at and/or below fluid interface 44 may permit and/or facilitate detection of downhole obstructions 90. Such downhole obstructions otherwise could not be acoustically detected in a configuration in which the acoustic pulse generator and the sensor assembly are not downhole from the fluid interface.

As discussed, downhole tool 100 includes acoustic pulse generator 120 and sensor assembly 140. Acoustic pulse generator 120 may be configured to generate acoustic pulse 122 within a wellbore liquid, such as fluid 40 and/or second fluid 42, that extends within wellbore 50 and that fluidly contacts the downhole tool. As discussed, acoustic pulse generator 120 directs acoustic pulse 122 at least partially in downhole direction 58, thereby permitting and/or facilitating reflection of the acoustic pulse from downhole obstruction(s) 90 and/or generation of reflected acoustic pulse 124.

Sensor assembly 140 includes an acoustic detector 142 that is configured to detect reflected acoustic pulse 124. This may include detection of the reflected acoustic pulse within the wellbore liquid and/or in target region 54 of the wellbore. As discussed, reflected acoustic pulse 124 includes a portion of acoustic pulse 122 that was reflected in uphole direction 56 from and/or by downhole obstruction(s) 90.

As illustrated in solid lines in FIG. 1, tool 100 also includes a positioning mechanism 110. Positioning mechanism 110 is configured to facilitate positioning of downhole tool 100 within target region 54 of the wellbore. Positioning mechanism 110 may include and/or be any suitable structure that may be adapted, configured, designed, and/or constructed to facilitate, direct, and/or determine the positioning of tool 100. As examples, positioning mechanism 110 may include a tether 112 that extends at least partially between the downhole tool and the surface region, a cable that extends at least partially between the downhole tool and the surface region, a threaded rod that extends at least partially between the downhole tool and the surface region, a threaded pipe that extends at least partially between the downhole tool and the surface region, and/or a spoolable pipe that extends at least partially between the downhole tool and the surface region. Such positioning mechanisms may be temporarily attached to tool 100, such as during positioning of tool 100, when tool 100 cannot be flowed to the target region of the wellbore, and/or when tool 100 cannot be flowed back to the surface region from the target region of the wellbore. Additionally or alternatively, such positioning mechanisms may be permanently attached to tool 100. Such positioning mechanisms may be referred to herein as extending at least partially, or even completely, between tool 100 and a wellhead 60 of the hydrocarbon well. Another example of positioning mechanism 110 includes a tractor 114 configured to provide a motive force that positions the downhole tool within the target region of the wellbore.

Positioning mechanism 110 additionally or alternatively may include a position detection structure 116. Position detection structure 116, when present, may be configured to determine when the downhole tool is within the target region of the wellbore. Position detection structure 116 may include any suitable structure. As an example, the position detection structure may include a casing collar locator configured to detect the motion of tool 100 past casing collars of the hydrocarbon well. As another example, the position detection structure may include a fluid analysis structure configured to detect, via one or more properties of fluid 40, when at least acoustic pulse generator 120 and sensor assembly 140 are within and/or are in fluid contact with second fluid 42.

Acoustic pulse generator 120 may include any suitable structure that may be adapted, configured, designed, and/or constructed to generate acoustic pulse 122 within the wellbore liquid and/or to direct the acoustic pulse at least partially in downhole direction 58. Examples of the acoustic pulse generator include an electric acoustic pulse generator, an electrically controlled acoustic pulse generator, and/or an electrically actuated acoustic pulse generator.

The acoustic pulse generator may generate the acoustic pulse in any suitable manner. As an example, the acoustic pulse generator may be configured to generate a pressure differential within the wellbore liquid, and the pressure differential may provide a motive force for propagation of the acoustic pulse within the wellbore liquid. As a more specific example, the acoustic pulse generator may include a fluid chamber 126 and a flow control device 128. The flow-control device may be configured to be selectively transitioned from a closed state to an open state. When in the closed state, the flow control device may fluidly isolate the fluid chamber from the wellbore liquid. When in the open state, the flow control device may provide fluid communication between the fluid chamber and the wellbore liquid. Examples of the flow control device include a valve, an electrically actuated valve, a pressure-actuated valve, a burst disc, an electrically actuated burst disc, and/or a pressure-actuated burst disc.

The fluid chamber may include and/or be a pressurized fluid chamber that includes a pressurized gas. Under these conditions, a gas pressure of the pressurized gas may be greater than a wellbore liquid pressure of the wellbore liquid that fluidly contacts the downhole tool. As such, when the flow control device is transitioned to the open state, the pressurized gas may be released into the wellbore liquid, thereby generating the acoustic pulse.

The fluid chamber additionally or alternatively may include and/or be a low-pressure fluid chamber, such as an atmospheric pressure fluid chamber. Under these conditions, a pressure within the low-pressure fluid chamber may be less than the wellbore liquid pressure. As such, when the flow control device is transitioned to the open state, the wellbore liquid may flow into the low-pressure fluid chamber, thereby generating the acoustic pulse.

As another example, the acoustic pulse generator may include an explosive charge. The explosive charge 130 may be configured to explode and/or to detonate to generate the acoustic pulse within the wellbore liquid. As additional examples, the acoustic pulse generator may include a vibrating diaphragm 132, a hydraulic jar 134, and/or a speaker 136.

It is within the scope of the present disclosure that acoustic pulse generator 120 may be configured to generate any suitable number of acoustic pulses 122. As examples, the acoustic pulse generator may be configured to generate a single acoustic pulse within the wellbore liquid and/or plurality of acoustic pulses within the wellbore liquid. When the acoustic pulse generator is configured to generate the plurality of acoustic pulses within the wellbore liquid, the acoustic pulse generator may generate the plurality of acoustic pulses while the downhole tool is positioned within the target region of the wellbore and/or during a single instance of the downhole tool being positioned within the wellbore.

Examples of the acoustic pulse include a vibration within the wellbore liquid and/or a pressure pulse within the wellbore liquid. When the acoustic pulse includes the pressure pulse, the pressure pulse may have and/or define a threshold magnitude. Examples of the threshold magnitude include threshold magnitudes of at least 1 megapascal, at least 2 megapascals, at least 3 megapascals, at least 4 megapascals, at least 5 megapascals, at least 6 megapascals, at least 7 megapascals, at least 8 megapascals, at least 10 megapascals, at least 12.5 megapascals, at least 15 megapascals, at least 20 megapascals, at most 40 megapascals, at most 35 megapascals, at most 30 megapascals, at most 25 megapascals, at most 20 megapascals, at most 15 megapascals, and/or at most 10 megapascals.

When the acoustic pulse includes the pressure pulse, the pressure pulse additionally or alternatively may have and/or define a threshold duration. Examples of the threshold duration include threshold durations of at least 0.1 second (s), at least 0.2 s, at least 0.3 s, at least 0.4 s, at least 0.5 s, at least 0.6 s, at least 0.8 s, at least 1 s, at most 5 s, at most 4 s, at most 3 s, at most 2 s, and/or at most 1 s.

Acoustic detector 142 may include and/or be any suitable structure that may be adapted, configured, designed, and/or constructed to detect the reflected acoustic pulse within the wellbore liquid. Examples of the acoustic detector include a sound detector, a pressure detector, a vibration detector, a microphone, and/or a hydrophone.

It is within the scope of the present disclosure that, in addition to acoustic sensor 142, sensor assembly 140 may include one or more additional sensors. Examples of such additional sensors include the casing collar locator, a pressure sensor, a temperature sensor, an accelerometer, and/or a fluid phase sensor. The pressure sensor, when present, may be configured to detect a pressure of the wellbore liquid that fluidly contacts the downhole tool. As an example, the pressure sensor may detect a pressure gradient as a function of depth within the wellbore and tool 100 may utilize the pressure gradient as the function of depth to determine if and/or when tool 100 passes through fluid interface 44. As another example, the pressure gradient as the function of depth may be utilized the calculate, estimate, and/or determine a speed of sound within the wellbore liquid, thereby permitting and/or facilitating calculation of the distance between tool 100 and downhole obstruction(s) 90, as discussed in more detail herein. The temperature sensor, when present, may be configured to detect a temperature of the wellbore liquid that fluidly contacts the downhole tool. Knowledge of the temperature of the wellbore liquid may permit and/or facilitate more accurate determination of the speed of sound within the wellbore liquid. The accelerometer, when present, may be configured to detect acceleration and/or motion of the downhole tool within the wellbore. Knowledge of the acceleration and/or motion of the downhole tool may permit and/or facilitate more accurate determination of a location of the downhole tool within the wellbore.

The fluid phase sensor, when present, may be utilized to detect a phase of fluid 40 that contacts downhole tool 100, acoustic pulse generator 120, and/or acoustic detector 142. This may include detection of the phase of first fluid 41 and/or of second fluid 42. The fluid phase sensor may detect whether the fluid is in the liquid phase or the gaseous phase. Additionally or alternatively, the fluid phase sensor may detect whether the fluid includes multiple phases, such as a mixture of gas and liquid, a mixture of two phase-separated liquids, and/or an emulsion of two phase-separated liquids. Examples of the fluid phase sensor include wave-based scanning systems, such as optical, ultrasonic, radar, sonar, and/or infrared wave-based scanning systems. In some circumstances, it may be beneficial to ensure that downhole tool 100, acoustic pulse generator 120, and/or acoustic detector 142 are in fluid contact with a selected fluid phase and/or are in fluid contact with a single fluid phase, and the presence of the fluid phase sensor may permit and/or facilitate this determination. In such circumstances, and if the fluid phase sensor detects a multi-phase fluid, it may be beneficial to move downhole tool 100 to another region of wellbore 50 and/or to wait a stabilization time for the fluid to phase-separate prior to utilizing the downhole tool to detect downhole obstructions 90.

As discussed, tool 100 may include and/or be an electric, an electrically powered, and/or an electrically actuated downhole tool. With this in mind, tool 100 may be powered, or may receive an electric current, in any suitable manner. As an example, tool 100 may include and/or be in electrical communication with a power cable 150 that may extend along wellbore 40 and/or that may be configured to electrically power, or to provide the electric current to, the downhole tool. As another example, tool 100 may include a battery 152 that may be configured to electrically power, or to provide the electric current to, the downhole tool.

It is within the scope of the present disclosure that tool 100 may be in direct and/or indirect wired and/or wireless communication with surface region 20. As an example, tool 100 may include and/or may be in communication with a data cable 154 that may extend along the wellbore and that may be configured to convey a wired data signal between the downhole tool and the surface region. As another example, tool 100 may include a wireless data transmission structure 156 that may be configured to convey a wireless data signal to the surface region. The wired data signal and/or the wireless data signal may be based upon and/or may be indicative of acoustic pulse 122 and/or reflected acoustic pulse 124. In such configurations, tool 100 may remain within wellbore 50 and/or within target region 54 while concurrently being in communication with the surface region.

As yet another example, tool 100 may include a data storage device 158. Data storage device 158, when present, may be configured to store a stored data signal that is based upon and/or indicative of acoustic pulse 122 and/or reflected acoustic pulse 124. In such a configuration, tool 100 may be retrieved from the wellbore to permit and/or facilitate capture, download, and/or analysis of the stored data signal. This may include retrieval to wellhead 60 and/or within a lubricator 62 of the hydrocarbon well. Examples of the data storage device include any suitable memory and/or non-volatile memory.

As illustrated in dashed lines in FIG. 1, tool 100 may include a controller 170. Controller 170, when present, may be adapted, configured, designed, constructed, and/or programmed to control the operation of at least a portion of the downhole tool. Controller 170 may be a downhole controller that is positioned within target region 54 with, or with a remainder of, downhole tool 100. Additionally or alternatively, controller 170 may be a surface controller that may be positioned within surface region 20 and may be in wired and/or wireless communication with the remainder of the downhole tool.

As an example, positioning mechanism 110 may be configured to generate a position detection signal and/or to provide the position detection signal to controller 170. Under these conditions, controller 170 may be programmed to initiate acoustic pulse 122 with acoustic pulse generator 120 based, at least in part, on the position signal. More specifically, the position signal may indicate if and/or when tool 100 is within target region 54. Controller 170 may initiate the acoustic pulse when the position signal indicates that the downhole tool is within the target region of the wellbore.

As another example, controller 170 may be programmed to generate a pulse initiation signal and/or to provide the pulse initiation signal to acoustic pulse generator 120, such as via a pulse initiation communication linkage. Under these conditions, the acoustic pulse generator may be configured to generate the acoustic pulse responsive to and/or based, at least in part, on receipt of the acoustic pulse initiation signal.

As yet another example, and upon detection of reflected acoustic pulse 124, sensor assembly 140 may be configured to generate a reflected pulse signal that is indicative of the reflected acoustic pulse. Under these conditions, the downhole tool further may be configured to provide the reflected acoustic pulse signal to controller 170, such as via a reflected pulse communication linkage. Additionally or alternatively, controller 170 may be programmed to analyze the reflected acoustic pulse signal, such as to detect, or quantify a location of, one or more downhole obstructions within the wellbore.

As illustrated in dashed lines in FIG. 1, tool 100 may include a back-reflection mitigation structure 180. Back-reflection mitigation structure 180, when present, may be configured to decrease a sensitivity of acoustic detector 142 to a back-reflected acoustic pulse that may be reflected uphole from acoustic pulse generator 120, such as at and/or by fluid interface 44. An example of back-reflection mitigation structure 180 includes an isolation device that may be positioned uphole from acoustic pulse generator 120 and/or uphole from sensor assembly 140. Examples of the isolation device include a packer, a damper, and/or an acoustic damper. Another example of back-reflection mitigation structure 180 includes an electronic filter that may be configured to distinguish the back-reflected acoustic pulse from reflected acoustic pulse 124.

As also illustrated in dashed lines in FIG. 1, tool 100 may include an interface retention mechanism 190. Interface retention mechanism 190, when present, may be configured to retain at least a portion of downhole tool 100 at, near, and/or downhole from fluid interface 44. As examples, the interface retention mechanism may be configured to retain acoustic pulse generator 120 and/or sensor assembly 140 downhole from the fluid interface. An example of interface retention mechanism 190 includes a buoyancy-modifying structure configured to cause tool 100 to be buoyant, or to float, at, near, and/or downhole from the fluid interface.

FIG. 3 is a flowchart depicting examples of methods 200, according to the present disclosure, of detecting a downhole obstruction within a wellbore that extends between a surface region and a subsurface region. The wellbore may form a portion of a hydrocarbon well, examples of which are disclosed herein with reference to hydrocarbon well 10 of FIG. 1. Methods 200 include positioning a downhole tool at 205 and may include waiting a threshold stabilization time at 210 and/or decreasing a sensitivity to a back-reflected acoustic signal at 215. Methods 200 also include generating an acoustic pulse at 220, propagating the acoustic pulse at 225, reflecting the acoustic pulse at 230, propagating a reflected acoustic pulse at 235, and/or receiving the reflected acoustic pulse at 240. Methods 200 also may include detecting an additional parameter at 245, determining an additional property at 250, storing a stored data signal at 255, and/or returning the downhole tool to a surface region at 260. Methods 200 include characterizing a downhole obstruction at 265 and may include repeating at least a portion of the methods at 270.

Positioning the downhole tool at 205 may include positioning the downhole tool within a target region of the wellbore. A wellbore liquid extends within the wellbore, and the positioning at 205 includes positioning such that the wellbore liquid fluidly contacts the downhole tool. Stated another way, at least a portion of the target region of the wellbore includes the wellbore liquid, and the positioning at 205 includes positioning at least a portion of the downhole tool is immersed in and/or within the wellbore liquid. Examples of the wellbore liquid are disclosed herein with reference to fluid 40 and/or second fluid 42 of FIG. 1.

The positioning at 205 may be accomplished in any suitable manner. As an example, the positioning at 205 may include flowing the downhole tool from the surface region to the target region of the wellbore. For example, this may include releasing the downhole tool from a lubricator of the hydrocarbon well.

It is within the scope of the present disclosure that the positioning at 205 may be performed subsequent, or responsive, to an obstruction indication that indicates the potential for an obstruction within the hydrocarbon well. Examples of the obstruction indication include an unexpected decrease in a flow rate of a produced fluid that is produced from the wellbore, an unexpected change in a pressure of the produced fluid, and/or an unexpected change in a temperature of the produced fluid. With this in mind, methods 200 also may include detecting the unexpected decrease in the flow rate, detecting the unexpected change in the pressure, and/or detecting the unexpected change in the temperature.

As discussed herein with reference to FIG. 1, a first fluid may extend within a first region of the wellbore and a second fluid may extend within a second region of the wellbore. The first fluid and the second fluid may define a fluid interface therebetween. The second region of the wellbore may be downhole from the first region of the wellbore, and the wellbore liquid may include and/or be the second fluid. Stated another way, the positioning at 205 may include conveying the downhole tool through the first fluid such that at least the acoustic pulse generator of the downhole tool and the acoustic detector of the downhole tool are downhole from the fluid interface and/or are immersed in the second fluid. This may permit and/or facilitate detection of downhole obstructions that are downhole from the fluid interface, as discussed in more detail herein.

It is within the scope of the present disclosure that the positioning further may include retaining the downhole tool at and/or near the fluid interface. This may include retaining the downhole tool with, via, and/or utilizing an interface retention mechanism of the downhole tool. Examples of the interface retention mechanism are disclosed herein with reference to interface retention mechanism 190 of FIG. 1.

Waiting the threshold stabilization time at 210 may include waiting any suitable threshold stabilization time, such as to permit, to facilitate, and/or to provide time for phase separation of wellbore fluids that extend within the wellbore. The waiting at 210 may be performed with any suitable timing and/or sequence during methods 200. As examples, the waiting at 210 may be performed subsequent to the positioning at 205 and/or prior to the generating at 220.

Examples of the threshold stabilization time include threshold stabilization times of at least 1 minute, at least 2 minutes, at least 3 minutes, at least 4 minutes, at least 5 minutes, at least 6 minutes, at least 8 minutes, at least 10 minutes, at least 15 minutes, and/or at least 30 minutes.

Decreasing the sensitivity to the back-reflected acoustic signal at 215 may include decreasing the sensitivity of the acoustic detector to the back-reflected acoustic signal. The back-reflected acoustic signal may be reflected uphole from the acoustic pulse generator. The decreasing at 215 may be accomplished in any suitable manner. As an example, the decreasing at 215 may include electronically filtering an acoustic signal received by the acoustic detector to distinguish the reflected acoustic pulse from the back-reflected acoustic pulse. As another example, the decreasing at 215 may include deploying a back-reflection mitigation structure uphole from the acoustic pulse generator and/or uphole from the sensor assembly. This may include deploying the back-reflection mitigation structure from the downhole tool and/or deploying from the surface region and independently from the positioning at 205. Examples of the back-reflection mitigation structure are disclosed herein.

Generating the acoustic pulse at 220 may include generating the acoustic pulse with an acoustic pulse generator of the downhole tool. The acoustic pulse generator may fluidly contact and/or may be immersed in the wellbore liquid. Stated another way, the positioning at 205 may include positioning such that the acoustic pulse generator fluidly contacts and/or is immersed in the wellbore liquid.

The generating at 220 may be accomplished in any suitable manner. As an example, the generating at 220 may include generating a pressure differential within the wellbore liquid. As another example, the generating at 220 may include releasing a pressurized gas within the wellbore liquid. As yet another example, the generating at 220 may include receiving the wellbore liquid within a fluid chamber of the downhole tool. As another example, the generating at 220 may include exploding an explosive charge of the downhole tool. As yet another example, the generating at 220 may include vibrating a diaphragm of the downhole tool. As another example, the generating at 220 may include actuating a hydraulic jar of the downhole tool. As yet another example, the generating at 220 may include powering a speaker of the downhole tool.

As another example, the generating at 220 may include generating a pressure pulse within the wellbore liquid. Examples of the pressure pulse are disclosed herein.

Examples of the acoustic pulse generator are disclosed herein with reference to acoustic pulse generator 120 of FIG. 1. Examples of the acoustic pulse are disclosed herein with reference to acoustic pulse 122 of FIG. 1

Propagating the acoustic pulse at 225 may include propagating the acoustic pulse in and/or within the wellbore liquid. Additionally or alternatively, the propagating at 225 may include propagating the acoustic pulse away from the acoustic pulse generator and/or propagating the acoustic pulse at least partially in a downhole direction.

Reflecting the acoustic pulse at 230 may include reflecting the acoustic pulse from a downhole obstruction that is downhole from the downhole tool. The reflecting at 230 may include reflecting to generate, or generating, the reflected acoustic pulse. Stated another way, during the reflecting at 230, the acoustic pulse may reflect from the downhole obstruction to produce and/or generate the reflected acoustic pulse.

Examples of the reflected acoustic pulse are discussed herein with reference to FIGS. 1-2. As discussed herein, a plurality of downhole obstructions may be downhole from the downhole tool. As also discussed herein, the acoustic pulse may reflect from a subset of the plurality of downhole obstructions or even from each downhole obstruction. Under these conditions, the reflecting at 230 may include reflecting from the subset of the plurality of downhole obstructions and/or generating a corresponding reflected acoustic pulse via reflection from each downhole obstruction in the plurality of downhole obstructions.

Propagating the reflected acoustic pulse at 235 may include propagating the reflected acoustic pulse away from the downhole obstruction. This may include propagating the reflected acoustic pulse, or at least a portion of the reflected acoustic pulse, in an uphole direction and/or toward the downhole tool.

Receiving the reflected acoustic pulse at 240 may include receiving the reflected acoustic pulse with an acoustic detector of a sensor assembly of the downhole tool. The acoustic detector and/or the sensor assembly may fluidly contact and/or may be immersed in the wellbore liquid. Stated another way, the positioning at 205 may include positioning such that the acoustic detector and/or such that the sensor assembly fluidly contacts and/or is immersed in the wellbore liquid.

Examples of the sensor assembly are disclosed herein with reference to sensor assembly 140 of FIG. 1. Examples of the acoustic detector are disclosed herein with reference to acoustic detector 142 of FIG. 1.

Detecting the additional parameter at 245 may include detecting and/or quantifying any suitable additional parameter of the hydrocarbon well and/or of the wellbore liquid in any suitable manner. As an example, the detecting at 245 may include detecting with, via, and/or utilizing the sensor assembly. As another example, the detecting at 245 may include detecting a pressure of the wellbore liquid that fluidly contacts the downhole tool. As yet another example, the detecting at 245 may include detecting a pressure gradient as a function of depth within the wellbore liquid, such as during the positioning at 205. As another example, the detecting at 245 may include detecting a phase of fluid that contacts the downhole tool. Under these conditions, the waiting at 210 may include waiting until the detecting at 245 detects that a desired phase of fluid and/or that only a single phase of fluid contacts the downhole tool. Additionally or alternatively, the positioning at 205 may include positioning such that the downhole tool contacts only a single phase of fluid when in the target region of the wellbore. This may include changing and/or modifying the target region of the wellbore if, when the downhole tool is within an initial target region of the wellbore, the detecting at 245 determines that the downhole tool contacts a multi-phase fluid.

Determining the additional property at 250 may include determining any suitable property of the hydrocarbon well and/or of the wellbore liquid. As an example, and when the detecting at 245 includes detecting the pressure gradient as the function of depth, the determining at 250 may include determining a speed of sound within the wellbore liquid based, at least in part, on the pressure gradient as the function of depth. Additionally or alternatively, the determining at 250 may include determining that the downhole tool fluidly contacts the wellbore liquid and/or that the downhole tool has passed through, or downhole from, the fluid interface based, at least in part, on the pressure gradient.

Storing the stored data signal at 255 may include storing any suitable stored data signal with, via, and/or utilizing the downhole tool. As an example, the storing at 255 may include storing a stored data signal that is indicative of and/or based upon the reflected acoustic pulse. As another example, the storing at 255 may include storing with, via, and/or utilizing a data storage device of the downhole tool. Examples of the data storage device are disclosed herein with reference to data storage device 158 of FIG. 1.

Returning the downhole tool to the surface region at 260 may be performed subsequent to the receiving at 240 and may be performed in any suitable manner and/or for any suitable purpose. As an example, the returning at 260 may include flowing the downhole tool from the target region of the wellbore to the surface region. As another example, the returning at 260 may include establishing a pressure differential within the wellbore that provides a motive force for flow of the downhole tool to the surface region. As yet another example, the returning at 260 may include receiving the downhole tool within a lubricator of the hydrocarbon well.

As additional examples, the returning at 260 may include retrieving the downhole tool with, via, and/or utilizing a tether, a cable, a threaded rod, a threaded pipe, and/or a spoolable pipe that extends at least partially between the downhole tool and the surface region. This may include attaching and/or interlocking the tether, the cable, the threaded rod, the threaded pipe, and/or the spoolable pipe to the downhole device prior to performing the returning at 260. In some examples, the tether, the cable, the threaded rod, the threaded pipe, and/or the spoolable pipe may be utilized, during the returning at 260, when the downhole tool cannot be flowed back to the surface region.

Characterizing the downhole obstruction at 265 may include characterizing the downhole obstruction based, at least in part, on the reflected acoustic pulse and/or based, at least in part, on at least one property of the reflected acoustic pulse. The characterizing at 265 may include characterizing the downhole obstruction in any suitable manner and/or characterizing any suitable property of the downhole obstruction.

As examples, the characterizing at 265 may include determining a location of the downhole obstruction within the wellbore and/or determining a distance between the downhole tool and the downhole obstruction. The location of the downhole obstruction and/or the distance between the downhole tool and the downhole obstruction may be characterized based, at least in part, on a time between the generating at 220 and the receiving at 240, a speed of the acoustic pulse within the wellbore liquid, a speed of the reflected acoustic pulse within the wellbore liquid, a model of the acoustic pulse as it propagates within the wellbore, and/or a model of the reflected acoustic pulse as it propagates within the wellbore. An example of a model that may be utilized to model propagation of the acoustic pulse and/or of the reflected acoustic pulse includes a forward model. Such a forward model may estimate variations in the cross-sectional area for propagation of the acoustic pulse as a function distance along the wellbore to predict properties of the reflected acoustic pulse. The forward model then may compare the actual reflected acoustic pulse to the predicted properties of the reflected acoustic pulse and modify the estimate of variations in the cross-sectional area for propagation of the acoustic pulse until the predicted properties of the reflected acoustic pulse at least substantially match the reflected acoustic pulse.

As discussed herein, the speed of sound in the wellbore liquid may be determined during the determining at 250. As also discussed herein, the speed of sound within the wellbore may change and/or vary with variations in the cross-sectional area of the wellbore and/or with variations in the cross-sectional area for propagation of the acoustic pulse, such as may be caused by the presence of the downhole obstructions. With this in mind, the model may include an analysis of variation in the speed of sound within the wellbore and/or the determining at 250 may include quantifying the variation in the speed of sound within the wellbore.

As another example, the characterizing at 265 may include identifying at least one acoustic property of the downhole obstruction. As yet another example, the characterizing at 265 may include determining an extent of the downhole obstruction. The extent of the downhole obstruction may be determined based, at least in part, on an amplitude of the reflected acoustic pulse and may include determining the extent along a length of the wellbore and/or determining the extent across a transverse cross-section of the wellbore.

Repeating at least the portion of the methods at 270 may include repeating any suitable step of methods 200 with any suitable timing and/or sequence. As an example, the acoustic pulse may be a first acoustic pulse and the reflected acoustic pulse may be a first reflected acoustic pulse. Under these conditions, the repeating at 270 may include repeating the generating at 220 to generate a second acoustic pulse, repeating the propagating at 225 to propagate the second acoustic pulse within the wellbore liquid, repeating the reflecting at 230 to reflect the second acoustic pulse and to generate a second reflected acoustic pulse, repeating the propagating at 235 to propagate the second reflected acoustic pulse within the wellbore liquid, and/or repeating the receiving at 240 to receive the second reflected acoustic pulse.

When methods 200 include the repeating at 270, the characterizing at 265 may be based, at least in part, on the first reflected acoustic pulse and on the second reflected acoustic pulse. As an example, the repeating may include repeating while the downhole tool is positioned within the target region of the wellbore. Under these conditions, the characterizing at 265 may include characterizing the downhole obstruction based upon an average of, or an average of information provided by, the first reflected acoustic pulse and the second reflected acoustic pulse.

As another example, the target region of the wellbore may be a first target region of the wellbore and the repeating at 270 further may include repeating the positioning at 205 to position the downhole tool within a second region of the wellbore that differs from the first region of the wellbore. Under these conditions, the generating at 220, the propagating at 225, the reflecting at 230, the propagating at 235, and/or the receiving at 240 may be repeated while the downhole tool is in the second region of the wellbore. Furthermore, methods 200 further may include determining the speed of sound within the wellbore liquid based, at least in part, on a distance between the first target region and a second target region, on a time between the generating the first acoustic pulse and the receiving the first reflected acoustic pulse, and/or on a time between the generating the second acoustic pulse and the receiving the second acoustic pulse. Stated another way, the repeating at 270 may provide information regarding a change in time needed for the acoustic pulse to travel between the downhole tool and the downhole obstruction as a function of a change in distance between the downhole tool and the downhole obstruction, thereby permitting and/or facilitating measurement and/or calculation of the speed of sound within the wellbore liquid, which then may be utilized during the characterizing at 265.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A downhole tool configured to be positioned within a wellbore to acoustically detect a downhole obstruction within the wellbore, the downhole tool comprising:
   a positioning mechanism configured to facilitate conveying the downhole tool through a first region of the wellbore including a gas and selectively positioning the downhole tool within a second region of the wellbore including a liquid, wherein the second region is downhole from the first region, wherein a gas-liquid interface is defined between the first region and the second region, and wherein the positioning mechanism comprises a fluid analysis structure configured to detect when at least a portion of the downhole tool is in fluid contact with the liquid within the second region of the wellbore;
   an interface retention mechanism configured to retain the at least the portion of the downhole tool within the second region of the wellbore, wherein the interface retention mechanism comprises a buoyancy-modifying structure configured to cause the at least the portion of the downhole tool to be buoyant downhole from the gas-liquid interface;
   an acoustic pulse generator configured to generate an acoustic pulse within the liquid extending within the second region of the wellbore, wherein the generated acoustic pulse is directed at least partially in a downhole direction;
   a sensor assembly that includes an acoustic detector configured to detect a reflected acoustic pulse within the liquid extending within the second region of the wellbore, wherein the reflected acoustic pulse is a portion of the generated acoustic pulse that after traveling in a downhole direction is acoustically reflected by the downhole obstruction back in an uphole direction from the downhole obstruction toward the acoustic detector; and
   a controller programmed to control the operation of at least a portion of the downhole tool, wherein the positioning mechanism is configured to provide a position signal to the controller indicating that the downhole tool is positioned within the second region of the wellbore, and further wherein the controller is programmed to initiate the acoustic pulse, with the acoustic pulse generator, based, at least in part, on the position signal.

2. The downhole tool of claim 1, wherein the acoustic pulse generator is configured to generate a plurality of acoustic pulses within the liquid while the downhole tool is positioned within the second region of the wellbore.

3. The downhole tool of claim 1, wherein the acoustic pulse generator is configured to generate a pressure differential within the liquid, wherein the pressure differential provides a motive force for propagation of the acoustic pulse within the liquid.

4. The downhole tool of claim 1, wherein the acoustic pulse generator includes a fluid chamber and a flow control device configured to be selectively transitioned from a closed state, in which the flow control device fluidly isolates the fluid chamber from the liquid, and an open state, in which the flow control device provides fluid communication between the fluid chamber and the liquid.

5. The downhole tool of claim 1, wherein the acoustic pulse generator includes an explosive charge configured to explode to generate the acoustic pulse within the liquid.

6. The downhole tool of claim 1, wherein the acoustic pulse generator includes at least one of:
   (i) a vibrating diaphragm;
   (ii) a hydraulic jar; or
   (iii) a speaker.

7. The downhole of claim 1, wherein the acoustic detector includes at least one of:
   (i) a sound detector;
   (ii) a pressure detector;
   (iii) a vibration detector;
   (iv) a microphone; or
   (v) a hydrophone.

8. The downhole tool of claim 1, wherein the downhole tool further includes a back-reflection mitigation structure configured to decrease a sensitivity of the acoustic detector to a back-reflected acoustic pulse that is reflected uphole from the acoustic pulse generator.

9. A hydrocarbon well system, comprising:
   a wellhead;
   a wellbore associated with the wellhead and drilled within a subsurface region;
   a gas extending within a first region of the wellbore;
   a liquid extending within a second region of the wellbore, wherein the second region of the wellbore is downhole from the first region of the wellbore;
   a gas-liquid interface defined between the first region and the second region; and
   the downhole tool of claim 1, wherein at least the acoustic pulse generator of the downhole tool and the sensor assembly of the downhole tool are within the second region of the wellbore.

10. A method of detecting a downhole obstruction within a wellbore that extends between a surface region and a subsurface region, the method comprising:
   conveying a downhole tool though a first region of a wellbore including a gas;
   positioning the downhole tool within a second region of the wellbore including a liquid, wherein the second region is downhole from the first region, wherein a gas-liquid interface is defined between the first region and the second region, wherein the positioning includes positioning via a positioning mechanism of the downhole tool such that the liquid fluidly contacts at least a portion of the downhole tool, and wherein the positioning mechanism comprises a fluid analysis structure configured to detect when the liquid fluidly contacts the at least the portion of the downhole tool; and wherein the downhole tool comprises a controller programmed to control the operation of at least a portion of the downhole tool, wherein the positioning mechanism is configured to provide a position signal to the controller indicating that the downhole tool is positioned within the second region of the wellbore, and wherein the positioning further includes retaining the at least the portion of the downhole tool within the second region of the wellbore using an interface retention mechanism of the downhole tool that comprises a buoyancy-modifying structure configured to cause the at least the portion of the downhole tool to be buoyant downhole from the gas-liquid interface;

generating an acoustic pulse with an acoustic pulse generator of the downhole tool, wherein the controller is programmed to initiate the acoustic pulse, with the acoustic pulse generator, based, at least in part, on the position signal;

propagating the acoustic pulse within the liquid and at least partially in a downhole direction from the downhole tool;

reflecting the acoustic pulse from a downhole obstruction to generate a reflected acoustic pulse, wherein the downhole obstruction is downhole from the downhole tool;

propagating the reflected acoustic pulse within the liquid and in an uphole direction from the downhole obstruction;

receiving the reflected acoustic pulse with an acoustic detector of a sensor assembly of the downhole tool; and characterizing the downhole obstruction based, at least in part, on the reflected acoustic pulse.

11. The method of claim 10, wherein the positioning includes positioning responsive to an obstruction indication that indicates the potential for an obstruction within the wellbore, wherein the obstruction indication includes at least one of:
(i) an unexpected decrease in a flow rate of a produced fluid that is produced from the wellbore;
(ii) an unexpected change in a pressure of the produced fluid; or
(iii) an unexpected change in a temperature of the produced fluid.

12. The method of claim 10, wherein the characterizing includes determining a location of the downhole obstruction within the wellbore.

13. The method of claim 12, wherein the determining the location includes determining the location based, at least in part, on at least one of:
(i) a time between the generating the acoustic pulse and the receiving the reflected acoustic pulse;
(ii) a speed of the acoustic pulse within the liquid;
(iii) a speed of the reflected acoustic pulse within the liquid;
(iv) a variation in speed of the acoustic pulse with position within the wellbore; or
(v) a variation in speed of the reflected acoustic pulse with position within the wellbore.

14. The method of claim 10, wherein the characterizing includes determining an extent of the downhole obstruction.

15. The method of claim 10, wherein the method further includes decreasing a sensitivity of the acoustic detector to a back-reflected acoustic signal that is reflected uphole from the acoustic pulse generator.

16. The method of claim 10, wherein the method further includes detecting a pressure gradient as a function of depth within the liquid.

17. The method of claim 16, wherein the method further includes at least one of:
(i) determining a speed of sound within the liquid based, at least in part, on the pressure gradient; or
(ii) determining that the downhole tool fluidly contacts the liquid second fluid based, at least in part, on the pressure gradient.

18. The method of claim 10, wherein the acoustic pulse is a first acoustic pulse, wherein the reflected acoustic pulse is a first reflected acoustic pulse, and further wherein the method includes repeating the method, by:
(i) repeating the generating to generate a second acoustic pulse;
(ii) repeating the propagating the acoustic pulse to propagate the second acoustic pulse;
(iii) repeating the reflecting the acoustic pulse to reflect the second acoustic pulse and generate a second reflected acoustic pulse;
(iv) repeating the propagating the reflected acoustic pulse to propagate the second reflected acoustic pulse; and
(v) repeating the receiving the reflected acoustic pulse to receive the second reflected acoustic pulse.

19. The method of claim 18, wherein the characterizing is based, at least in part, on the first reflected acoustic pulse and on the second reflected acoustic pulse.

20. The method of claim 18, wherein the repeating the method includes repeating the method while the downhole tool is positioned within the second region of the wellbore.

21. The method of claim 20, wherein the second region of the wellbore is a first target region of the wellbore, wherein the repeating the method includes repeating the positioning to position the downhole tool within a second target region of the wellbore, and further wherein the repeating the generating includes repeating the generating while the downhole tool is within the second target region of the wellbore.

22. The method of claim 21, wherein the method further includes determining a speed of sound within the wellbore liquid based, at least in part, on:
(i) a distance between the first target region and the second target region;
(ii) a time between the generating the first acoustic pulse and the receiving the first reflected acoustic pulse; and
(iii) a time between the generating the second acoustic pulse and the receiving the second reflected acoustic pulse.

* * * * *